Patented Dec. 1, 1953

2,661,353

UNITED STATES PATENT OFFICE 2,661,353

N,N-DISUBSTITUTED 9-XANTHENECARBOXAMIDES

John W. Cusic, Skokie, Ill., assignor to G. D. Searle & Co., Chicago, Ill., a corporation of Illinois No Drawing. Application August 2, 1951, Serial No. 240,060

11 Claims. (Cl. 260—335)

The present invention relates to a new class of heterocyclic organic compounds and in particular to the N,N-disubstituted 9-xanthenecarboxamides. These compounds can be represented by the structural formula

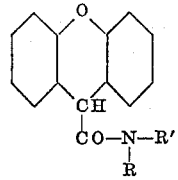

In this formula R is a hydrocarbon radical of no more than 15 carbon atoms and R' is a lower alkyl radical or a basically substituted lower alkyl radical.

Among the radicals which R can represent are such lower alkyl radicals as methyl, ethyl, propyl, butyl, amyl, and hexyl. But of particular interest are those hydrocarbon radicals which contain a carbocyclic ring and especially a benzene ring such as phenyl, benzyl, phenylethyl, and lower nuclear alkyl substitution products thereof, such as tolyl, xylyl, cumyl, cymyl, and the like. Also of special value have been found the compounds wherein the above mentioned benzene ring is partially or totally hydrogenated as in the case of cyclohexenyl, tetrahydrophenylalkyl and related hydrocarbons, and other cycloalkyl rings as cyclopentyl.

The radical R' in the above formula can be a lower alkyl radical as defined above. However, of special interest are the basically substituted alkyl radicals of the type

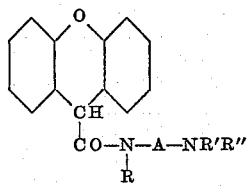

and salts thereof, wherein A is a lower alkylene radical and the radical NR'R'' is a lower dialkylamino group or a nitrogen containing saturated heteromonocycle such as piperidine, lupetidine, pyrrolidine, morpholine, thiamorpholine, piperazine, or N'-alkylpiperazine.

The N-basically substituted 9-xanthenecarboxamides form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide; phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The compounds which constitute this invention are valuable intermediates in organic synthesis. These compounds, and in particular the basically substituted alkyl derivatives, have been found to possess a number of highly useful pharmacodynamic properties. They have a pronounced effect on the circulatory system and the kidney. The salts and especially the quaternary salts, are of value because of their inhibitory effect on certain autonomic nervous functions. These salts are useful in combatting parasites.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples temperatures are given uncorrected in degrees centigrade (°C.) and quantities of materials in parts by weight.

EXAMPLE 1

N,N-diethyl-9-xanthenecarboxamide

A mixture of 244 parts of 9-xanthenecarboxylic acid chloride is treated with 80 parts of diethylamine and 1500 parts of benzene at reflux temperature for 2 hours. After cooling the mixture is treated with dilute hydrochloric acid solution and the benzene layer is separated, dried over anhydrous calcium chloride, stirred with charcoal and evaporated. The N,N-diethyl-9-xanthenecarboxamide thus obtained is recrystallized from ethanol. The colorless crystals have the structural formula

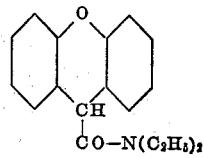

EXAMPLE 2

N-(β-diethylaminoethyl)-9-xanthene-carboxanilide

A mixture of 244 parts of 9-xanthenecarboxylic acid chloride and 192 parts of N-(β-diethylaminoethyl)-aniline in 1600 parts of benzene is heated at reflux temperature for 2 hours. After cooling the solid precipitate is collected on a filter, decolorized with the aid of charcoal and recrystallized from dilute isopropanol. The hydrochloride of N-(β-diethylaminoethyl)-9-xanthenecarboxanilide thus obtained melts at about 229–230° C. It has the structural formula

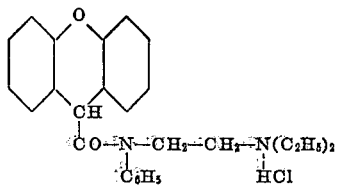

EXAMPLE 3

N-benzyl-N-(β-diethylaminoethyl)-9-xanthenecarboxamide

A mixture of 122 parts of 9-xanthenecarboxylic acid chloride and 103 parts of N-(β-diethylaminoethyl)-benzylamine in 1600 parts of butanone is heated at reflux temperature for 2 hours. Upon cooling a heavy precipitate forms within a few minutes. The hydrochloride of N-benzyl-N-(β-diethylaminoethyl)-9-xanthenecarboxamide thus obtained is collected on a filter and recrystallized from dilute isopropanol, using decolorizing charcoal as a clarifying agent. The salt melts at about 207–208° C. It has the structural formula

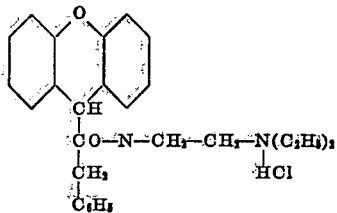

EXAMPLE 4

N-benzyl-N-(β-morpholinoethyl)-9-xanthenecarboxamide 244 parts of 9-xanthenecarboxylic acid chloride, 220 parts of 1-(β-benzylaminoethyl)morpholine and 1600 parts of butanone are stirred. There is an immediate reaction with formation of a precipitate. The mixture is heated at reflux temperature for 2 hours and then chilled. The resulting precipitate is collected on a filter and recrystallized from dilute isopropanol. The hydrochloride of N-benzyl-N-(β-morpholinoethyl)-9-xanthenecarboxamide thus obtained melts at about 216–217° C. It has the structural formula

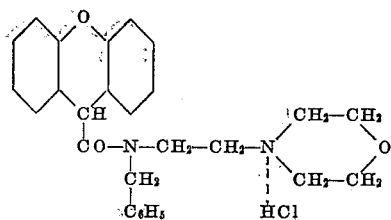

EXAMPLE 5

N-(δ-piperidinobutyl)-N-(β-3,4-dimethylphenylethyl)-9-xanthenecarboxamide

A mixture of 156 parts of 1-(δ-aminobutyl)-piperidine and 169 parts of 4-(β-chloroethyl)-xylene in 1200 parts of toluene is heated at reflux temperature for 10 hours. The reaction product is poured over ice and treated with dilute hydrochloric acid. The aqueous layer is rendered alkaline by addition of sodium hydroxide and then extracted with ether. The ether extract is dried over anhydrous sodium sulfate, filtered and evaporated. 288 parts of N-(δ-piperidinobutyl)-3,4-dimethylphenethylamine thus obtained are boiled with 244 parts of 9-xanthenecarboxylic acid chloride and 2000 parts of benzene at reflux temperature for 3 hours. After cooling the mixture is treated with dilute hydrochloric acid. The acidic layer is separated, shaken with ether, and then rendered alkaline with dilute sodium hydroxide and extracted with ether. The ether extract is dried over anhydrous potassium carbonate, stirred with decolorizing charcoal, filtered and evaporated. The resulting oil consists of N-(δ-piperidinobutyl)-N-(β-3,4-dimethylphenylethyl)-9-xanthenecarboxamide which has the structural formula shown below. A white crystalline hydrochloride is obtained by treatment with alcoholic hydrogen chloride. This salt has the structural formula

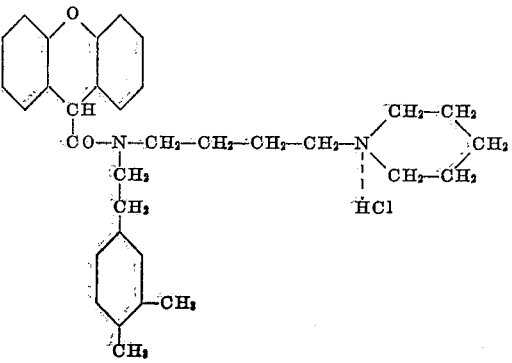

EXAMPLE 6

N-(β-diethylaminoethyl)-N-(2-methyl-1,2,3,6-tetrahydrobenzyl)-9-xanthenecarboxamide A mixture of 372 parts of 2-methyl-1,2,3,6-tetrahydrobenzaldehyde and 400 parts of 1-diethylamino-2-aminoethane is hydrogenated with 40 parts of Raney nickel, 10 parts of a 1% chloroplatinic acid solution and 1200 parts of ethanol at 50 to 20 lbs. pressure. After opening of the bomb the contents are filtered and most of the solvent is removed from the filtrate by evaporation. The concentrate is treated with ice and dilute hydrochloric acid. The aqueous layer is separated and rendered alkaline by addition of dilute sodium hydroxide and extracted with ether. The ether extract is dried over anhydrous potassium carbonate, filtered and evaporated. The N-(β-diethylaminoethyl)-2-methyl-1,2,3,6-tetrahydrobenzylamine is distilled at about 95–96° C. at 2 mm. pressure.

228 parts of the distillate are treated with 244 parts of 9-xanthenecarboxylic acid chloride in 2400 parts of butanone and heated at reflux temperature for 24 hours. The mixture is then stirred with charcoal, filtered while hot, and cooled. The precipitated hydrochloride of N-(β-diethylaminoethyl)-N-(2-methyl-1,2,3,6-tetrahydrobenzyl)-9-xanthenecarboxamide melts at about 188-189° C. It has the structural formula

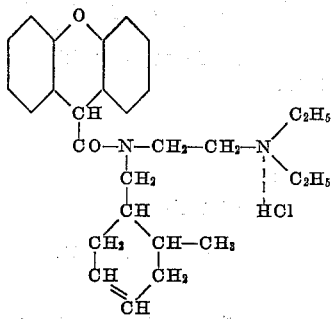

EXAMPLE 7

N - cyclohexyl-N-(β - diethylaminoethyl) -9-xanthenecarboxamide

A mixture of 393 parts of cyclohexanone, 464 parts of 1-diethylamino-2-aminoethane, 240 parts of ethanol and 40 parts of Raney nickel is hydrogenated in a Parr bomb at 120° C. and 500 lbs. pressure for 20 hours. The contents are removed and the filtrate treated with dilute hydrochloric acid. The acidic solution is rendered alkaline by the addition of dilute sodium hydroxide and extracted with ether. The ether extract is dried over anhydrous calcium chloride, filtered and evaporated. The β-diethylaminoethylcyclohexylamine is then distilled at about 111-114° C. and 7 mm. pressure. 198 parts of the distillate and 244 parts of 9-xanthenecarboxylic acid chloride are dissolved in 2500 parts of butanone and heated at reflux temperature for 4 hours. A precipitate begins to occur within a few minutes. After allowing the reaction mixture to stand for about 2 days the crystalline residue of N-cyclohexyl-N-(β-diethylaminoethyl)-9-xanthenecarboxamide hydrochloride is recrystallized from isopropanol. It melts at about 216-217° C. The base has the structural formula

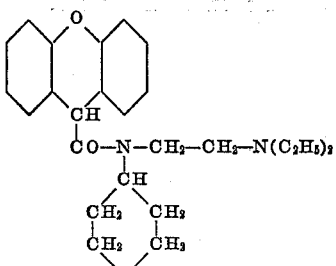

EXAMPLE 8

N-(3 - methylcyclopentyl)-N-(γ-dimethylaminobutyl)-9-xanthenecarboxamide

To a mixture of 196 parts of 3-methylcyclopentanone and 232 parts of N,N-dimethylputrescine, 94 parts of 98% formic acid are gradually added. The initial reaction is controlled by efficient refrigeration. The mixture is then heated at reflux temperature for 6 hours with agitation and permitted to stand at room temperature for several hours. After cooling 220 parts of concentrated hydrochloric acid are added and refluxing is resumed for 7 hours. 300 parts of water are added and the mixture is washed with benzene, made alkaline with potassium carbonate and extracted with benzene. The benzene extract is washed with water, dried with anhydrous sodium sulfate and evaporated in vacuo. 198 parts of the resulting N,N-dimethyl-N'-(3-methylcyclopentyl)putrescine are heated at reflux temperature with 244 parts of 9-xanthenecarboxylic acid chloride in 2600 parts of benzene with mechanical stirring for 5 to 6 hours and then permitted to cool. The resulting white crystals are dissolved in water and the solution is rendered alkaline by addition of dilute potassium hydroxide. The base is extracted with ether and the ether extract dried over anhydrous potassium carbonate, filtered and evaporated. The resulting base has the structural formula

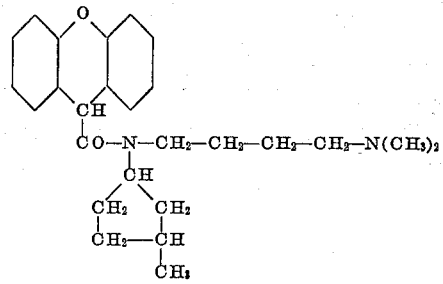

I claim:
1. The 9-xanthenecarboxamides of the structural formula

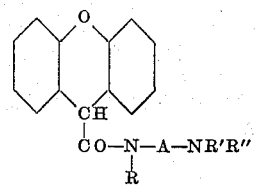

wherein R is a hydrogenated lower phenylalkyl radical of no more than 10 carbon atoms, A is a lower alkylene radical containing at least 2 carbon atoms and R' and R'' are lower alkyl radicals.

2. The xanthene-9-carboxamides of the structural formula

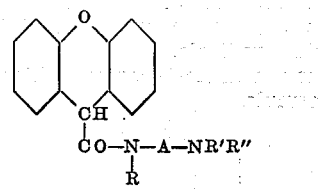

wherein R is a lower-alkyl substituted lower tetrahydrophenylalkyl radical of no more than 10 carbon atoms, A is a lower alkylene radical containing at least 2 carbon atoms, and R' and R'' are lower alkyl radicals.

3. The xanthene-9-carboxamides of the structural formula

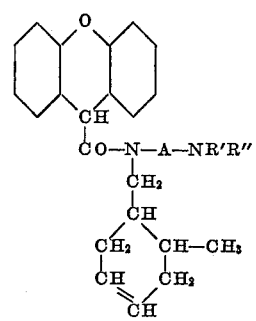

wherein A is a lower alkylene radical containing at least 2 carbon atoms and R' and R'' are lower alkyl radicals.

4. The xanthene-9-carboxamides of the structural formula

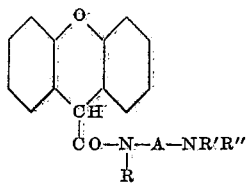

wherein R is a lower monocyclic hydrocarbon radical of no more than 10 carbon atoms and containing 5 to 6 carbon atoms in the monocycle, A is a lower alkylene radical containing at least 2 carbon atoms and R′ and R″ are lower alkyl radicals.

5. The xanthene-9-carboxamides of the structural formula

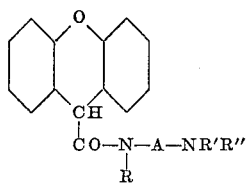

wherein R is a phenylalkyl radical of no more than 10 carbon atoms, A is a lower alkylene radical containing at least 2 carbon atoms, and R′ and R″ are lower alkyl radicals.

6. The xanthene-9-carboxamides of the structural formula

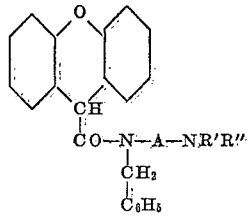

wherein A is a lower alkylene radical containing at least two carbon atoms and R′ and R″ are lower alkyl radicals.

7. The xanthene-9-carboxamides of the structural formula

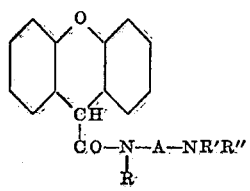

wherein R is a lower cycloalkyl radical containing 5 to 6 nuclear carbon atoms, A is a lower alkylene radical containing at least 2 carbon atoms and R′ and R″ are lower alkyl radicals.

8. The xanthene-9-carboxamides of the structural formula

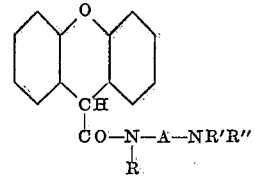

wherein R is a lower monocyclic hydrocarbon radical of no more than 10 carbon atoms and containing 5 to 6 carbon atoms in the monocycle, A is a lower alkylene radical containing at least 2 carbon atoms and NR′R″ is an amino radical of the class consisting of lower dialkylamino, piperidino and morpholino radicals.

9. N - cyclohexyl - N - (β - diethylaminoethyl) - 9-xanthenecarboxamide.

10. N - (β - diethylaminoethyl) - N - (2 - methyl - 1,2,3,6 - tetrahydrobenzyl) - 9 - xanthenecarboxamide.

11. The xanthene-9-carboxamides of the structural formula

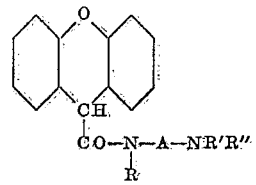

wherein R is a phenyl radical, A is a lower alkylene radical containing at least 2 carbon atoms, and R′ and R″ are lower alkyl radicals.

JOHN W. CUSIC.

No references cited.